(12) United States Patent
Huang et al.

(10) Patent No.: US 7,772,713 B2
(45) Date of Patent: Aug. 10, 2010

(54) METHOD AND SYSTEM FOR CONTROLLING A WIND TURBINE

(75) Inventors: Xiongzhe Huang, Shanghai (CN); Danian Zheng, Simpsonville, SC (US); Wei Xiong, Sichuan (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/570,676

(22) Filed: Sep. 30, 2009

(65) Prior Publication Data

US 2010/0133827 A1 Jun. 3, 2010

(51) Int. Cl.
F03D 9/00 (2006.01)
(52) U.S. Cl. ........................................ 290/44
(58) Field of Classification Search ............... 290/44, 290/55
See application file for complete search history.

(56) References Cited

U.S. PATENT DOCUMENTS

| 4,420,692 | A | 12/1983 | Kos et al. | |
|---|---|---|---|---|
| 6,876,099 | B2 | 4/2005 | Wobben | |
| 6,891,280 | B2 * | 5/2005 | Siegfriedsen | 290/44 |
| 7,100,438 | B2 | 9/2006 | LeMieux | |
| 7,246,991 | B2 | 7/2007 | Bosche | |
| 7,309,930 | B2 * | 12/2007 | Suryanarayanan et al. | 290/55 |
| 7,317,260 | B2 | 1/2008 | Wilson | |
| 7,400,055 | B2 * | 7/2008 | Nagao | 290/44 |
| 7,423,352 | B2 * | 9/2008 | Suryanarayanan et al. | 290/55 |
| 7,550,862 | B2 * | 6/2009 | Altemark | 290/44 |
| 2006/0033338 | A1 * | 2/2006 | Wilson | 290/44 |
| 2007/0018457 | A1 | 1/2007 | Llorente Gonzalez | |
| 2008/0206051 | A1 | 8/2008 | Wakasa et al. | |
| 2009/0021015 | A1 * | 1/2009 | Pedersen | 290/44 |
| 2009/0184519 | A1 | 7/2009 | Nies et al. | |
| 2009/0295161 | A1 * | 12/2009 | Steiner et al. | 290/44 |

FOREIGN PATENT DOCUMENTS

WO 2009010059 A2 1/2009

* cited by examiner

*Primary Examiner*—Joseph Waks
(74) *Attorney, Agent, or Firm*—James McGinness, Esq.; Armstrong Teasdale LLP

(57) ABSTRACT

A control system for a wind turbine having a tower, a generator, and at least one rotor blade. The control system includes a sensor configured to measure an angle of inclination of the tower with respect to a surface, at least one pitch assembly configured to adjust a pitch angle of the rotor blade, and a controller configured to control at least one of the pitch assembly and the generator based on the measured angle of inclination.

20 Claims, 4 Drawing Sheets

METHOD AND SYSTEM FOR CONTROLLING A WIND TURBINE

BACKGROUND OF THE INVENTION

The subject matter described herein relates generally to wind turbines and, more particularly, to a method and system for controlling a wind turbine.

Wind turbines generally include a rotor having multiple rotor blades that are attached to a rotatable hub. The rotor transforms wind energy into a rotational torque that drives one or more shafts. Often, the shafts are rotatably coupled to a gearbox that steps up the inherently low rotational speed of the rotor. The gearbox rotates a high speed shaft that drives a generator to produce electrical power, which is fed into a utility grid or to another destination.

At least some known wind turbines are designed to operate within certain torque or power limits to minimize damage to one or more components of the wind turbines due to a force of wind. When wind strikes a wind turbine blade, the force of wind generates a torque and a thrust force on the blade. The torque causes the blade to rotate and produce electrical power. The thrust force, however, may cause damage to the blade and/or to other components of the wind turbine. At least some known wind turbines do not effectively measure the thrust force induced to blades of a wind turbine by the force of wind. To prevent the thrust force from becoming excessive, at least some known wind turbines calculate thrust force from wind speed, and utilize an open loop control system that includes large margins on operating parameters. These large margins may reduce the amount of torque, and therefore power, that can be generated by the wind turbine. As such, known wind turbines often adjust a pitch angle of one or more rotor blades to reduce an amount of energy captured by the rotor blades when the wind speeds are above rated levels.

At least one known wind turbine uses an accelerometer to measure a displacement of the wind turbine tower and/or nacelle due to a force of wind striking the tower and/or nacelle, and to calculate wind speed. However, known accelerometers may be used to measure high frequency motion, but known accelerometers may be less accurate for low speed and/or low frequency motion. For example, at least some large wind turbines may oscillate at about 0.35 Hz or less, and an accelerometer may not be sufficiently accurate to measure such motion. Moreover, at least one known wind turbine includes a control system that monitors a power output of the generator and increases the pitch angle of the rotor blades if the generator speed and/or the power output is near rated levels. However, such control system may cause the wind turbine to operate inefficiently.

BRIEF DESCRIPTION OF THE INVENTION

In one embodiment, a control system for a wind turbine having a tower, a generator, and at least one rotor blade is provided. The control system includes a sensor configured to measure an angle of inclination of the tower with respect to a surface, at least one pitch assembly configured to adjust a pitch angle of the rotor blade, and a controller configured to control at least one of the pitch assembly and the generator based on the measured angle of inclination.

In another embodiment, a wind turbine is provided that includes a tower coupled to a surface, at least one rotor blade, and a generator. The wind turbine also includes a control system that includes a sensor configured to measure an angle of inclination of the tower with respect to the surface, at least one pitch assembly configured to adjust a pitch angle of the rotor blade, and a controller configured to control at least one of the pitch assembly and the generator based on the measured angle of inclination.

In another embodiment, a method of controlling a wind turbine is provided that includes using a sensor to measure an angle of inclination of a tower with respect to a surface and configuring a controller to control at least one of a pitch assembly and a generator based on the measured angle of inclination.

DETAILED DESCRIPTION OF THE INVENTION

The embodiments described herein measure an angle of inclination of a wind turbine tower with respect to a surface. A control system calculates one or more wind turbine properties based on the measured angle of inclination and compares the wind turbine properties to one or more desired operating properties of the wind turbine. The control system adjusts a pitch angle of one or more rotor blades of the wind turbine and/or a generator reactive torque based on the comparison. The adjustment of the pitch angle and/or the generator reactive torque increases or reduces an amount of force that is transferred to the wind turbine from the wind, thus adjusting a displacement and/or a loading of a nacelle, a tower, and/or a hub of the wind turbine.

Figure 1:
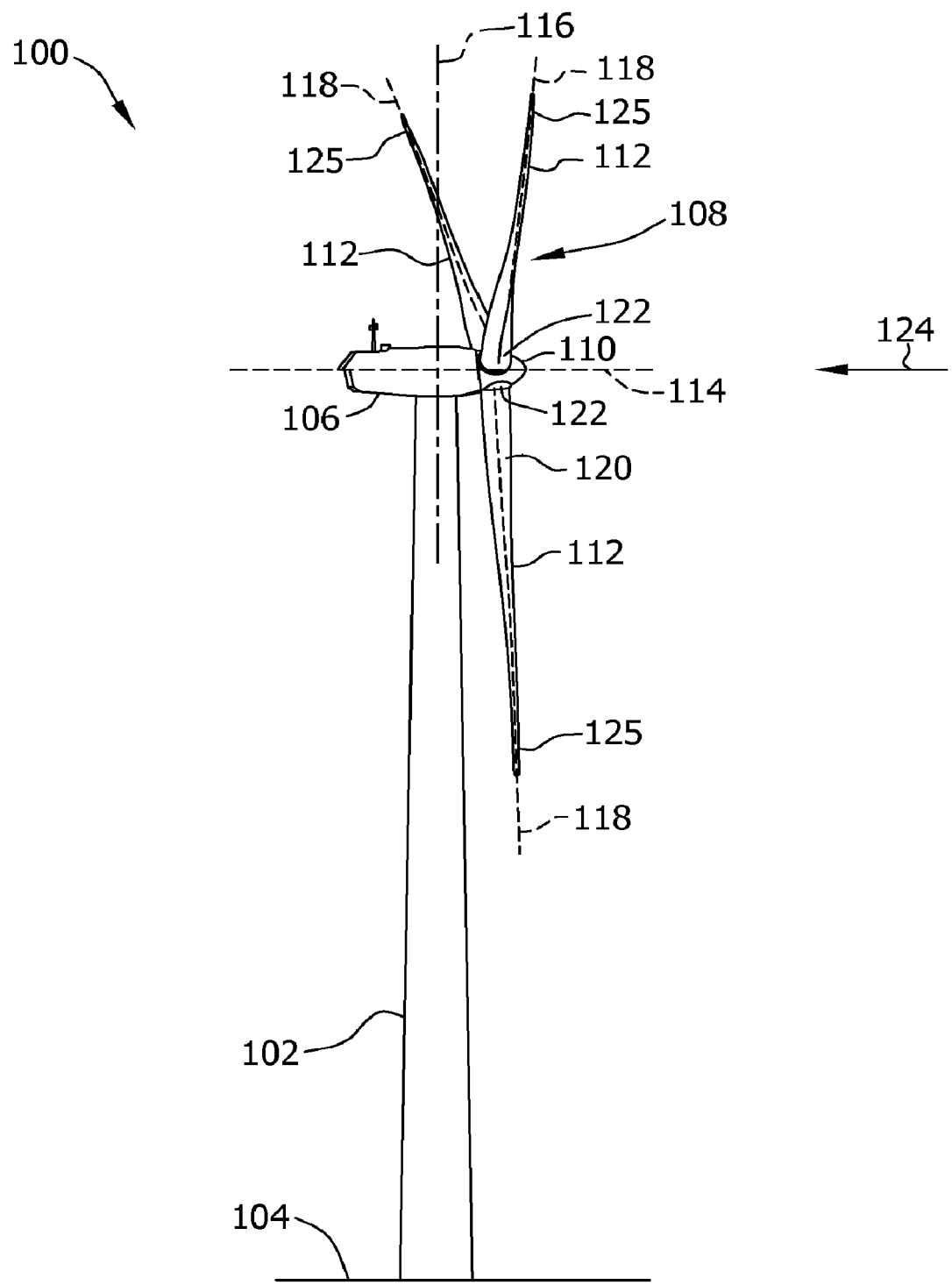
FIG. 1 is a schematic view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enable wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 124 into usable mechanical energy, and subsequently, electrical energy. Rotor 108 and nacelle 106 are rotated about tower 102 on a yaw axis 116 to control the perspective of rotor blades 112 with respect to the direction of wind 124. Rotor blades 112 are mated to hub 110 by coupling a blade root portion 120 to hub 110 at a plurality of load transfer regions 122. Load transfer regions 122 each have a hub load transfer region and a blade load transfer region (both not shown in FIG. 1). Loads induced to rotor blades 112 are transferred to hub 110 via load transfer regions 122. Each rotor blade 112 also includes a blade tip portion 125.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine generator to function as described herein. As wind 124 contacts rotor blade 112, blade lift forces are induced to rotor blade 112 and rotation of rotor 108 about an axis of rotation 114 is induced as blade tip portion 125 is accelerated.

A pitch angle (not shown) of rotor blades 112, i.e., an angle that determines an angle of attack of rotor blade 112 with respect to a direction of wind 124, may be changed by a pitch assembly (not shown in FIG. 1). Specifically, increasing a pitch angle of rotor blade 112 decreases the angle of attack of rotor blade 112 and, conversely, decreasing a pitch angle of rotor blade 112 increases the angle of attack of rotor blade 112. The pitch angles of rotor blades 112 are adjusted about a pitch axis 118 at each rotor blade 112. In the exemplary embodiment, the pitch angles of rotor blades 112 are controlled individually. Alternatively, the pitch angles of rotor blades 112 are controlled as a group. In one embodiment, the pitch angles of rotor blade 112 are controlled as a group with, for example, a reactive torque of a generator (not shown in FIG. 1) and/or a yaw direction.

Figure 2:
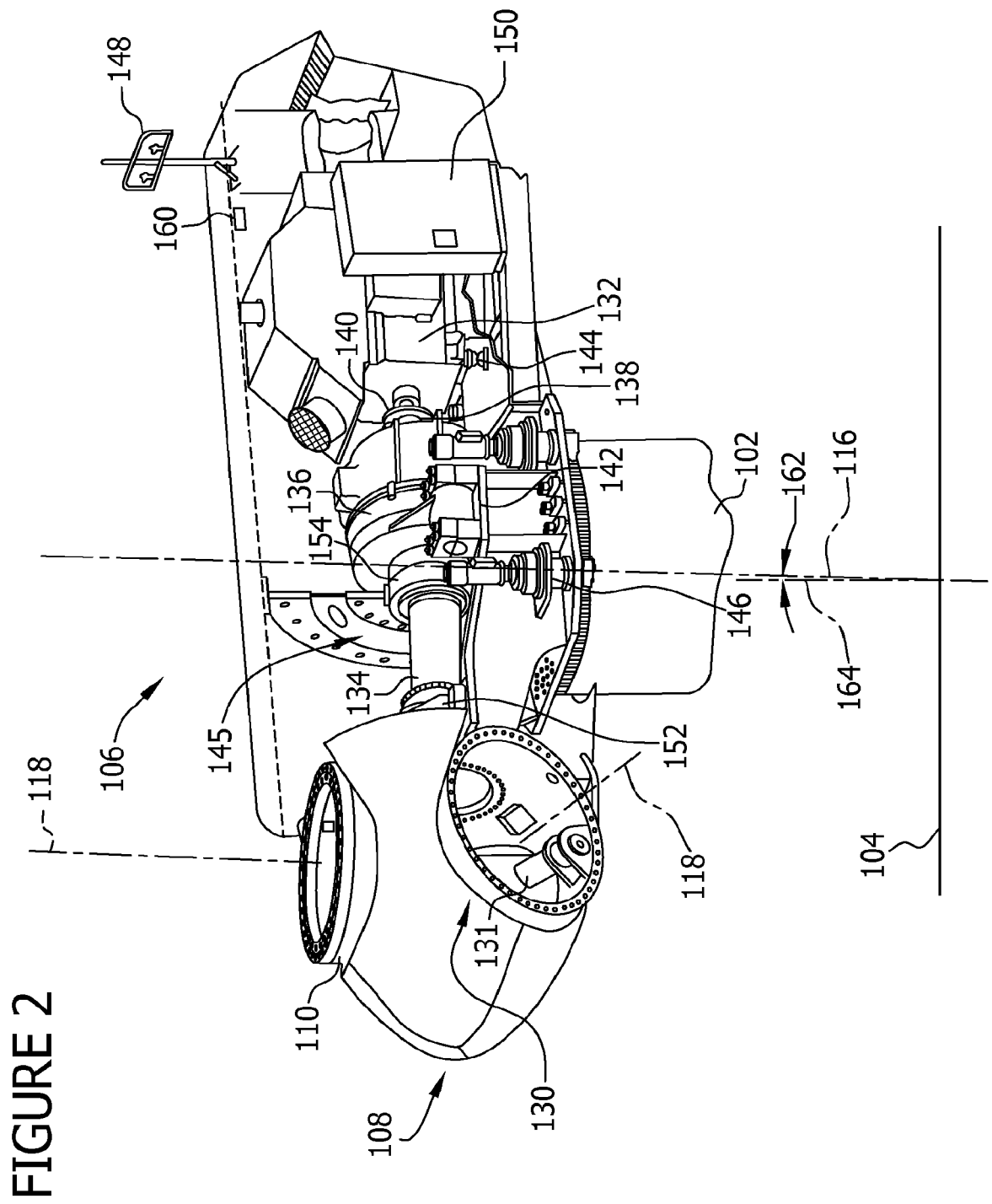
FIG. 2 is a partial sectional view of an exemplary nacelle that may be used with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 118. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via rotor shaft 134 (sometimes referred to as either a main shaft or a low speed shaft), a gearbox 136, a high speed shaft 138, and a coupling 140. Rotation of shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by support 142 and generator 132 is supported by support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 (shown in FIG. 1) to control the perspective of rotor blades 112 with respect to the direction of wind 124. Nacelle 106 also includes at least one meteorological mast 148 that includes a wind vane and anemometer (neither shown in FIG. 2). In one embodiment, mast 148 provides information, including wind direction and/or wind speed, to a control system 150. Control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, control system 150 may execute a SCADA (Supervisory, Control and Data Acquisition) program.

Pitch assembly 130 is operatively coupled to control system 150. In the exemplary embodiment, nacelle 106 also includes main, or forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Alternatively, nacelle 106 includes any number of support bearings that enable wind turbine 100 to function as disclosed herein. Rotor shaft 134, generator 132, gearbox 136, high speed shaft 138, coupling 140, and any associated fastening, support, and/or securing device including, but not limited to, supports 142 and 144, and support bearings 152 and 154, are sometimes referred to as a drive train 145.

In the exemplary embodiment, nacelle 106 includes a sensor 160 that measures an incline of tower 102. As used herein, the term "incline" refers to an angle of inclination 162 that yaw axis 116 forms with respect to a line 164 normal or substantially normal to surface 104. In the exemplary embodiment, sensor 160 is an inclinometer. Alternatively, sensor 160 is any suitable instrument that measures the incline of tower 102. In an alternative embodiment, sensor 160 is positioned within tower 102, or any other suitable location on or near tower 102 to measure angle of inclination 162.

Figure 3:
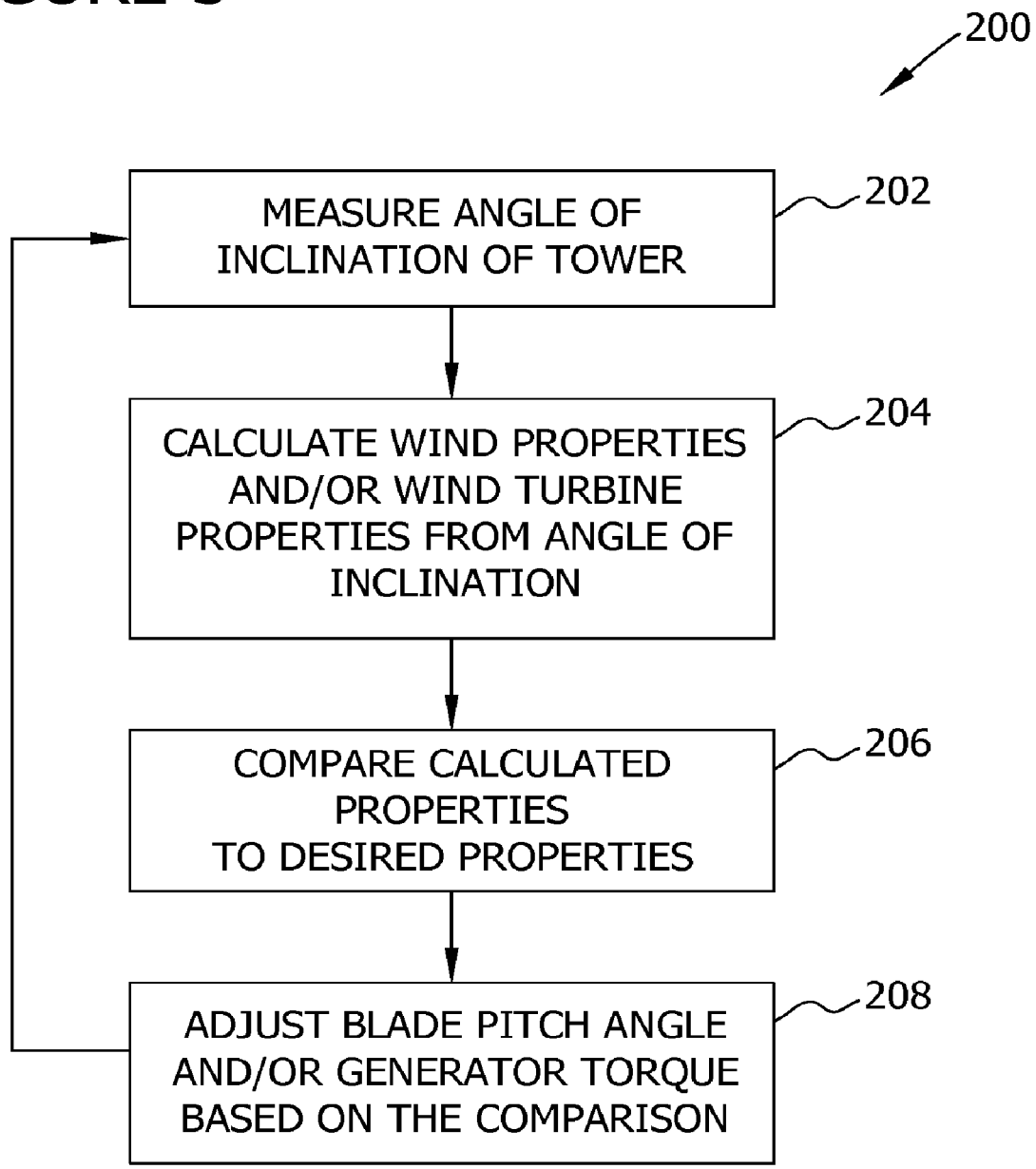
FIG. 3 is a flowchart of an exemplary method for controlling a wind turbine suitable for use with the wind turbine shown in FIG. 1.

FIG. 3 illustrates an exemplary method 200 for controlling a wind turbine, such as wind turbine 100 (shown in FIG. 1). In the exemplary embodiment, method 200 includes measuring 202 an incline of tower 102 (shown in FIG. 1) using sensor 160 (shown in FIG. 2). In one embodiment, sensor 160 measures 202 the incline of tower 102 periodically, such as between 20 and 100 times every second, or at any suitable time interval. In another embodiment, sensor 160 measures 202 the incline of tower 102 continuously. Sensor 160 transmits one or more signals representing each incline measurement to control system 150 (shown in FIG. 2).

Control system 150 analyzes the incline measurement signals received from sensor 160 and calculates 204 one or more wind properties and/or one or more wind turbine operating properties from the signals. In the exemplary embodiment, control system 150 calculates 204 a thrust force exerted on wind turbine 100 by wind 124 (shown in FIG. 1) (hereinafter referred to as "thrust force"). More specifically, when wind 124 strikes rotor 108 and nacelle 106, the thrust force displaces rotor 108 and nacelle 106. The displacement of rotor 108 and nacelle 106 causes tower 102 to bend and increases angle of inclination 162 and/or an oscillation frequency of tower 102, nacelle 106, and rotor 108. Sensor 160 measures 202 angle of inclination 162 and transmits signals representing angle of inclination 162 to control system 150. Control system 150 uses the measured angle of inclination 162 to calculate 204 the thrust force induced to wind turbine 100 by wind 124. In one embodiment, control system 150 references a lookup table (not shown) to determine an amount of force required to bend tower 102 by an amount approximately equal to angle of inclination 162, and uses the determined amount of force as the calculated 204 thrust force. In the exemplary embodiment, control system 150 uses a tower model to calculate 204 the thrust force based on angle of inclination 162. As used herein, the term "tower model" refers to a combination of equations, data, and mathematical representations that describes, calculates, and/or predicts an operation of one or more components of wind turbine 100.

Once control system 150 calculates 204 the thrust force, control system 150 may use the calculated thrust force to calculate 204 other wind properties, such as a speed, an acceleration, and/or any suitable property of wind 124. The thrust force is based on the speed of wind 124. Accordingly, control system 150 may calculate 204 the speed of wind 124 using the calculated thrust force using the tower model. Further, control system 150 may calculate 204 an acceleration of wind 124 by measuring and/or calculating a rate of change of the speed of wind 124. In a similar manner, control system 150 may use the calculated thrust force to calculate 204 other wind turbine properties, such as an oscillatory velocity, frequency, and acceleration of tower 102, nacelle 106, and rotor 108.

Control system 150 compares 206 the wind properties and/or the wind turbine properties to one or more corresponding desired operational properties of wind turbine 100. In the exemplary embodiment, the desired operational properties include a rated or desired wind speed for wind turbine 100, a rated or desired thrust force, and/or any suitable property. In the exemplary embodiment, the desired operational properties are predetermined and are stored within control system 150, such as within a memory (not shown) of control system 150. Alternatively, the desired operational properties may be stored remotely, such as in a remote server (not shown), or in any suitable location.

Control system 150 adjusts 208 the pitch angle of rotor blades 112 and/or a reactive torque of generator 132 (hereinafter referred to as "generator torque") based on comparison 206. For example, if the calculated 204 speed of wind 124 and/or the calculated thrust force is greater than a desired operating speed and/or a desired thrust force, respectively, of wind turbine 100, control system 150 increases the pitch angle of rotor blades 112 while substantially maintaining the generator torque to reduce an amount of thrust force transferred to rotor blades 112 by wind 124. In one embodiment, control system 150 increases the pitch angle of rotor blades 112 and increases or decreases the generator torque when the calculated 204 speed of wind 124 and/or the calculated thrust force is greater than a desired operating speed and/or a desired thrust force, respectively, of wind turbine 100. The reduction in the thrust force transmitted to rotor blades 112 reduces an amount of displacement, deformation, and loading of tower 102, nacelle 106, and/or rotor 108, reduces angle of inclination 162, and reduces the oscillation frequency of wind turbine 100. Conversely, if the calculated 204 speed and/or the calculated thrust force is less than a desired operating speed and/or a desired thrust force of wind turbine 100, respectively, control system 150 decreases the pitch angle of rotor blades 112 to increase an amount of thrust force transferred to rotor blades 112 and/or increases the generator torque to increase an amount of power captured by wind turbine 100. The increase in the thrust force transferred to rotor blades 112 increases an amount of displacement, deformation, and loading of tower 102, nacelle 106 and/or rotor 108, increases angle of inclination 162, and increases the oscillation frequency of wind turbine 100. After adjusting 208 the pitch angle of rotor blades 112 and/or adjusting the generator torque, method 200 returns to measuring 202 the incline of tower 102. As described above, method 200 uses a first, or previously measured angle of inclination 162 to adjust a second, or subsequent angle of inclination 162.

Figure 4:
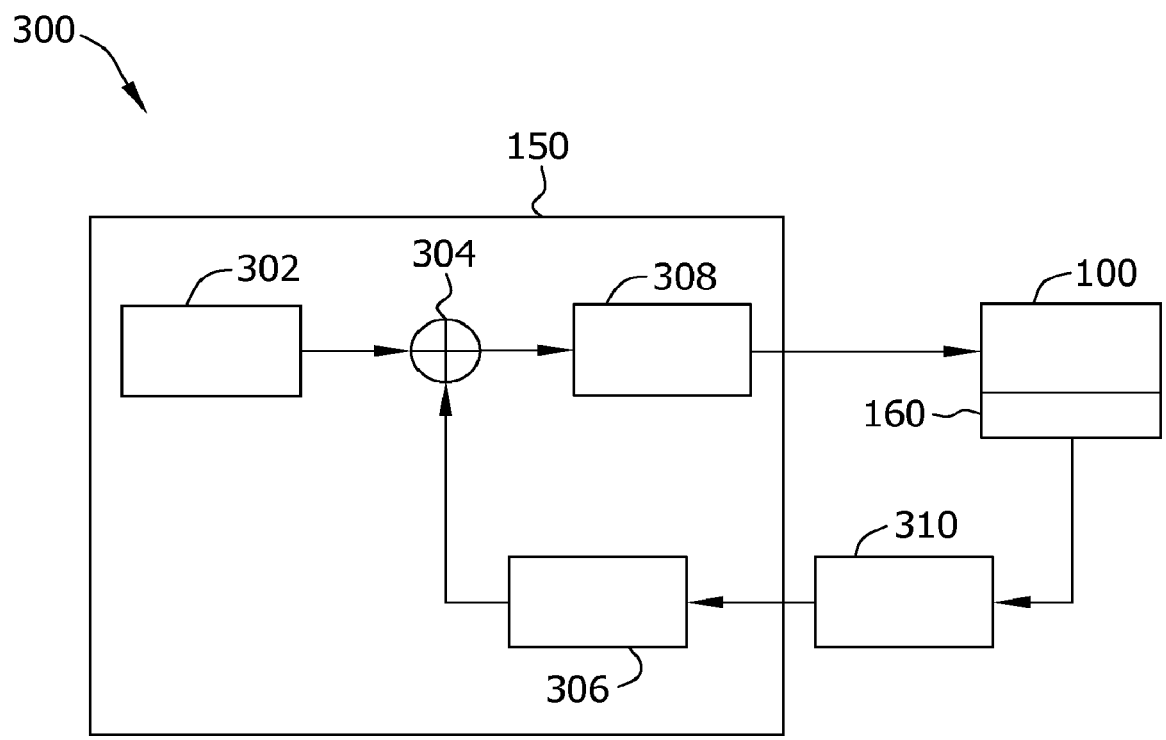
FIG. 4 is a block diagram of an exemplary control loop suitable for use with the wind turbine shown in FIG. 1.

FIG. 4 schematically shows an exemplary control loop 300 suitable for use with wind turbine 100 (shown in FIG. 1) and method 200 (shown in FIG. 3). Control loop 300 includes control system 150 that includes a reference module 302, a comparison module 304, a tower model 306, and a controller 308. Control loop 300 also includes wind turbine 100, sensor 160, and a filter 310. In one embodiment, filter 310 includes one or more circuits of control system 150. In another embodiment, filter 310 includes one or more circuits of sensor 160 and/or any suitable component of wind turbine 100. In yet another embodiment, filter 310 is a filter implemented in software that executes on one or more processors of control system 150, such as controller 308.

In the exemplary embodiment, reference module 302 transmits to comparison module 304 a signal including a value representing a desired or rated thrust force (or a range of thrust forces) at which wind turbine 100 is optimally designed to operate. Tower model 306 transmits to comparison module 304 a signal including a value representing a thrust force calculated from the generator torque and/or from conditions measured by sensor 160. In the exemplary embodiment, tower model 306 includes a second order mass-spring-damper dynamic system model that calculates a motion of tower 102 and/or nacelle 106 and the thrust force from angle of inclination 162 using the Euler-Bernoulli beam theory. Alternatively, tower model 306 includes any system model that enables control system 150 to operate as described herein. Comparison module 304 compares the values from reference module 302 and tower model 306, and transmits the result to controller 308. In the exemplary embodiment, controller 308 and/or control system 150 executes a proportional integral derivative (PID) algorithm to facilitate monitoring and adjusting the amount of force that wind turbine 100 receives from wind 124. In an alternative embodiment, controller 308 and/or control system 150 executes any suitable closed loop control algorithm that enables wind turbine 100 to operate as described herein.

Controller 308 uses (i.e. controls) one or more pitch assemblies 130 (shown in FIG. 2) to adjust the pitch angle of rotor blades 112 (shown in FIG. 1) and/or controls the generator torque based on the result of the comparison. More specifically, if the calculated thrust force is less than the desired thrust force, controller 308 decreases the pitch angle of rotor blades 112 and/or increases the generator torque such that rotor blades 112 capture more force from wind 124 (shown in FIG. 1). If the calculated thrust force is greater than the desired thrust force, controller 308 increases the pitch angle of rotor blades 112 while substantially maintaining the generator torque such that rotor blades 112 capture less force from wind 124. Sensor 160 measures an incline of tower 102 (shown in FIG. 1) as described above. Filter 310 receives signals representing the measured incline of tower 102 from sensor 160, and filter 310 provides filtered incline measurement signals to tower model 306. More specifically, filter 310 removes a noise component, such as high frequency noise, from the signals received from sensor 160. Tower model 306 calculates the thrust force from the filtered signals, and transmits the value representing the calculated thrust force to comparison module 304 as described above.

As described above, the use of method 200 (shown in FIG. 3) and control loop 300 (shown in FIG. 4) facilitates providing additional power capture compared to known wind turbines. A wind turbine's ability to capture power is limited by an amount of torque induced to the wind turbine blades and an amount of thrust force induced to the wind turbine by the wind. Known methods of operating wind turbines use an open loop control to operate wind turbine 100 within rated limits. Such methods may be less accurate at calculating thrust force than method 200 and control loop 300, and such methods may require high operating margins to be maintained on parameters that may reduce an amount of power that is able to be captured. Use of method 200 and control loop 300 facilitates operating wind turbine 100 with lower and more accurate margins to maximize the amount of power captured by wind turbine 100.

A technical effect of the system and method described herein includes at least one of: (a) coupling a tower to a surface; (b) coupling a nacelle to a tower; (c) coupling a hub to a nacelle; (d) coupling at least one blade to a hub; (e) coupling a generator to the wind turbine; and (f) coupling a control system within a nacelle. The control system has a sensor configured to measure an angle of inclination of a tower with respect to a surface, at least one pitch assembly configured to adjust a pitch angle of at least one blade, and a controller configured to control at least one of the at least one pitch assembly and the generator based on the measured angle of inclination.

The above-described embodiments facilitate providing an efficient and cost-effective system for controlling a wind turbine. The control system facilitates calculating a thrust force that is transferred to the wind turbine based on a measured angle of inclination of the wind turbine. Additional wind properties and wind turbine properties may be efficiently calculated using the calculated thrust force. As such, the control system facilitates providing a cost-effective solution for operating the wind turbine and the generator within rated limits. The control system also facilitates enabling the wind turbine to capture more energy from the wind than other known wind turbine systems. Moreover, by accurately and efficiently measuring the thrust force that is applied to the wind turbine, an amount of loading of the wind turbine and associated components may be minimized, as desired. As such, the wind turbine and/or the wind turbine components may exhibit a prolonged operating life.

Exemplary embodiments of a method and system for controlling a wind turbine are described above in detail. The method and system are not limited to the specific embodiments described herein, but rather, components of the system and/or steps of the method may be utilized independently and separately from other components and/or steps described herein. For example, the control system may also be used in combination with other measuring systems and methods, and is not limited to practice with only the wind turbine as described herein. Rather, the exemplary embodiment can be implemented and utilized in connection with many other power systems and applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for a wind turbine having a tower, a generator, and at least one rotor blade, said control system comprising:
    a sensor configured to measure an angle of inclination of the tower with respect to a surface;
    at least one pitch assembly configured to adjust a pitch angle of the rotor blade; and,
    a controller configured to control at least one of said pitch assembly and the generator based on the measured angle of inclination.

2. A control system in accordance with claim 1, further comprising a filter operatively coupled to said sensor, wherein said filter is configured to receive a signal representing the measured angle of inclination from said sensor and to filter the signal.

3. A control system in accordance with claim 1, wherein said sensor is configured to measure a first angle of inclination and said control system is configured to adjust a second angle of inclination of the tower based on the first angle of inclination.

4. A control system in accordance with claim 1, wherein said control system is configured to calculate a thrust force transferred to the wind turbine and to compare the calculated thrust force to a predetermined value.

5. A control system in accordance with claim 4, wherein said control system is configured to adjust a torque of the generator if the calculated thrust force is less than the predetermined value.

6. A control system in accordance with claim 4, wherein said control system is configured to decrease the pitch angle of the rotor blade if the calculated thrust force is less than the predetermined value.

7. A control system in accordance with claim 4, wherein said control system is configured to at least one of increase the pitch angle of the rotor blade and maintain a torque of the generator if the calculated thrust force is greater than the predetermined value.

8. A wind turbine, comprising:
    a tower coupled to a surface;
    at least one rotor blade;
    a generator; and,
    a control system comprising:
        a sensor configured to measure an angle of inclination of said tower with respect to the surface;
        at least one pitch assembly configured to adjust a pitch angle of said rotor blade; and,
        a controller configured to control at least one of said pitch assembly and said generator based on the measured angle of inclination.

9. A wind turbine in accordance with claim 8, further comprising a filter coupled to said sensor, wherein said filter is configured to receive a signal representing the measured angle of inclination from said sensor and to filter the signal.

10. A wind turbine in accordance with claim 8, wherein said sensor is configured to measure a first angle of inclination and said control system is configured to adjust a second angle of inclination of said tower based on said first angle of inclination.

11. A wind turbine in accordance with claim 8, wherein said control system is configured to calculate a thrust force transferred to said wind turbine and to compare the calculated thrust force to a predetermined value.

12. A wind turbine in accordance with claim 11, wherein said control system is configured to adjust a torque of said generator if the calculated thrust force is less than the predetermined value.

13. A wind turbine in accordance with claim 11, wherein said control system is configured to decrease the pitch angle of said rotor blade if the calculated thrust force is less than the predetermined value.

14. A wind turbine in accordance with claim 11, wherein said control system is configured to at least one of increase the pitch angle of said rotor blade and maintain a torque of said generator if the calculated thrust force is greater than the predetermined value.

15. A method of controlling a wind turbine, said method comprising:
  using a sensor to measure an angle of inclination of a tower with respect to a surface; and,
  configuring a controller to control at least one of a pitch assembly and a generator based on the measured angle of inclination.

16. A method in accordance with claim 15, further comprising configuring a filter to receive a signal representing the measured angle of inclination from the sensor and to filter the signal.

17. A method in accordance with claim 15, further comprising configuring the control system to calculate a thrust force transferred to the wind turbine.

18. A method in accordance with claim 17, further comprising configuring the control system to compare the calculated thrust force to a predetermined value.

19. A method in accordance with claim 18, further comprising configuring the control system to adjust a pitch angle of a rotor blade based on the result of the comparison.

20. A method in accordance with claim 18, further comprising configuring the control system to adjust a torque of the generator based on the result of the comparison.

* * * * *